(No Model.)
F. L. WHITE.
CHURN.
No. 331,598. Patented Dec. 1, 1885.
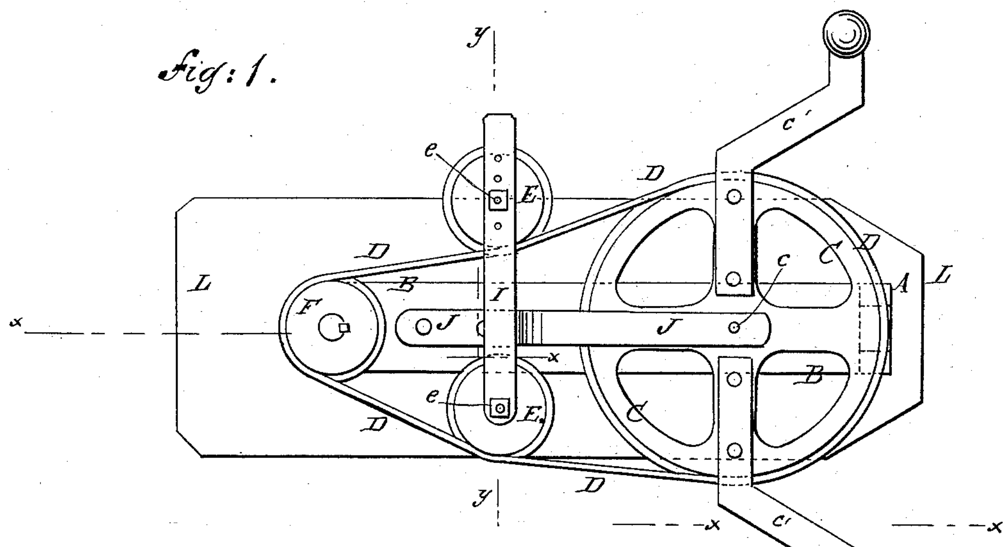
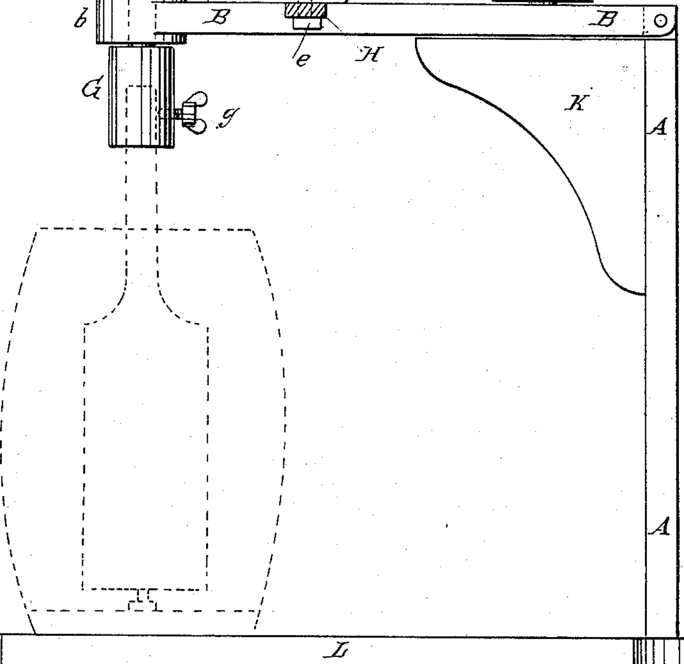
WITNESSES:
Chas Nida
C. Sedgwick
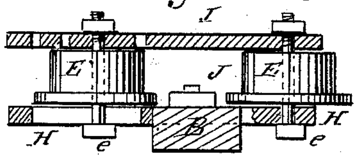
INVENTOR:
F. L. White
BY Munn & Co
ATTORNEYS.
N. PETERS, Photo-Lithographer, Washington, D. C.

UNITED STATES PATENT OFFICE.

FRANK LEWIS WHITE, OF GAINESVILLE, TEXAS.

CHURN.

SPECIFICATION forming part of Letters Patent No. 331,598, dated December 1, 1885.

Application filed October 2, 1884. Serial No. 144,539. (No model.)

*To all whom it may concern:*

Be it known that I, FRANK LEWIS WHITE, of Gainesville, in the county of Cooke and State of Texas, have invented a certain new and useful Improvement in Churns, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same, taken through the broken line *x x x x*, Fig. 1. Fig. 3 is a sectional front elevation of the same, taken through the line *y y*, Fig. 1.

The object of this invention is to facilitate the operation of churning.

The invention consists in the construction and combination of various parts of the mechanism, as will be hereinafter fully described, and then pointed out in the claims.

A represents a standard, which is attached at its lower end to the rear end of a base-plate or platform, L. The base-plate L is made of such a size that the churn can be placed upon its forward part, as indicated in dotted lines in Fig. 2.

To the upper end of the standard A is hinged the end of an arm, B, with which the operating parts of the mechanism are connected, so that the said arm and its attachments can be turned up into a vertical position to allow the dasher to be readily inserted in and removed from the churn, and to allow the churn to be readily placed upon and taken off the base-plate.

To the bar B at a little distance from its rear or hinged end is attached an axle, *c*, upon which is placed a driving wheel, C.

To the opposite parts of the upper surface of the driving-wheel C are attached two handles, *c'*, by means of which an oscillating movement can be given to the said wheel. The wheel C is held down upon the axle *c* by a brace, J, the rear end of which is placed upon the upper end of the said axle, and its forward part is bent downward and then forward, and its forward end is attached to the forward part of the bar B.

D is a belt which passes around the driving-wheel C, the adjustable belt-tightening wheels E, and the dasher-wheel F.

The wheels C E F are all made with flanges at the lower edges of their rims to keep the belt D in place.

The dasher-wheel F is attached to the upper end of the journal of the socket G, which revolves in a bearing, *b*, in the end of the arm B.

The socket G is provided with a thumb-screw, *g*, for securing the dasher-staff detachably in the said socket.

The adjustable belt-wheels E are supported by the cross-bar H, the middle part of which is let into and secured to the arm B, and is further secured in place by the brace J, which crosses its upper side.

The axles *e* of the belt-wheels E pass through the bar H, which is slotted at one or both ends to receive the said axles, so that the said wheels E can be adjusted farther apart or closer together to regulate the tension of the belt D, as may be required. The upper ends of the axles *e* pass through holes in the cross-bar I, placed above the said wheels E, and which has a number of holes formed through it, to receive the said axles in the various positions into which they may be adjusted.

The arm B and its attachments are supported when in a horizontal position by the bracket K, the lower arm of which is attached to the standard A. With this construction the arm B and its attachments can be raised into a vertical position, to allow the churn to be readily placed upon and removed from the base-plate L, and to allow the dasher to be readily inserted in and taken out of the churn.

Having thus described my invention, what I claim as new, and desire to secure by Letters Patent, is—

1. In combination with the standard A and bracket K, the hinged arm B, having bearing *b*, oscillating driving-wheel C, belt D, belt-tightening wheels E E, dasher-wheel F, and socket G, as herein shown and described.

2. In combination with the standard A, bracket K, hinged arm B, provided with bearing *b*, driving-wheel C, belt D, and dasher-wheel F, the slotted bar H, perforated bar I, and belt-wheels E E, adjustable on said bars, as herein shown and described.

3. The brace J, in combination with the arm B, axle *c*, and bar H, as herein shown and described, whereby the bar will be locked in place and the axle *c* supported, as set forth.

FRANK LEWIS WHITE.

Witnesses:
JOHN S. FLETCHER,
WM. RICE.